G. A. YEATON.
BELT TIGHTENER.
APPLICATION FILED JAN. 2, 1918.
1,301,026.
Patented Apr. 15, 1919.
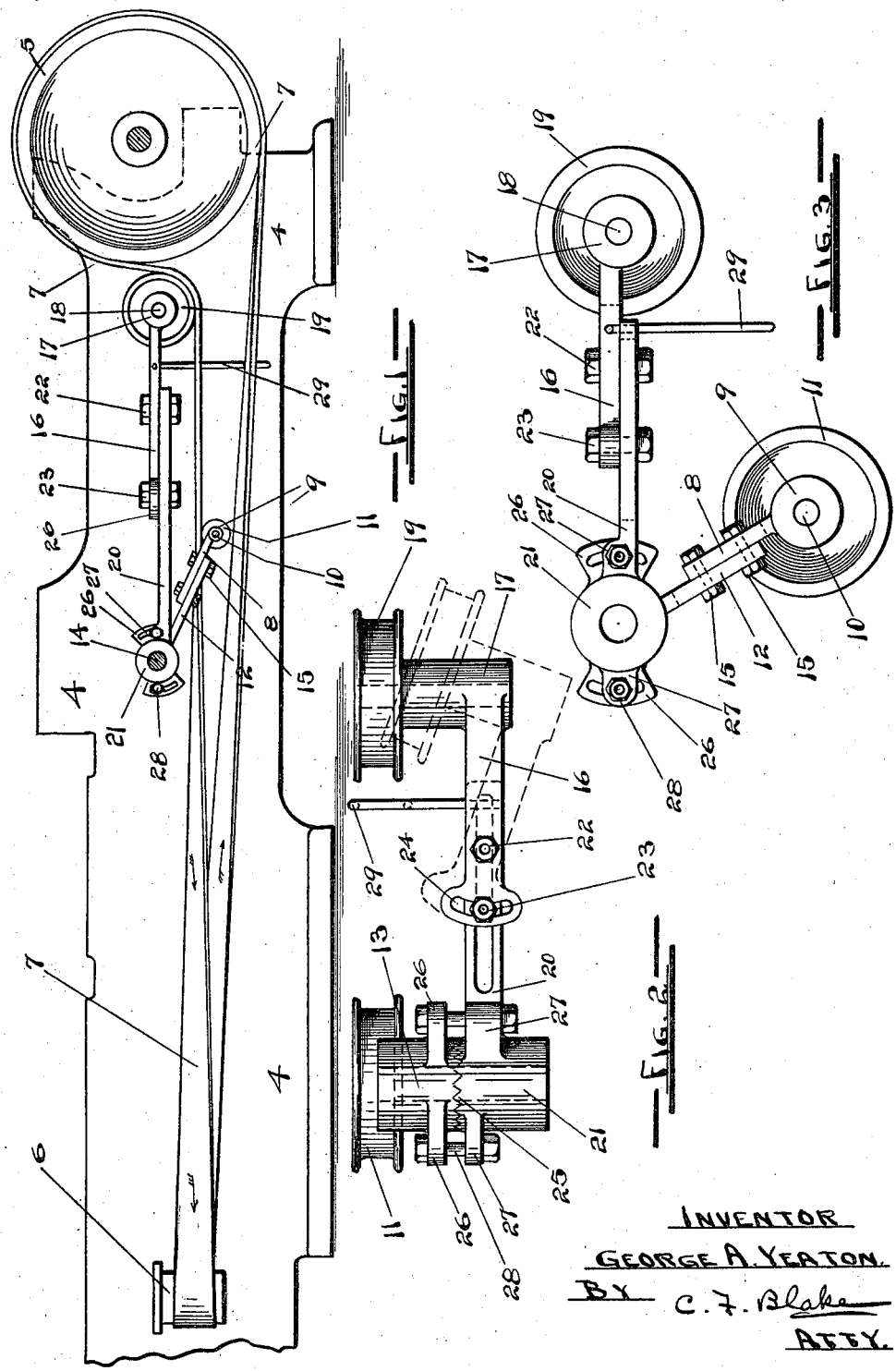
INVENTOR
GEORGE A. YEATON.
BY C. F. Blake
ATTY.

UNITED STATES PATENT OFFICE.

GEORGE A. YEATON, OF PORTLAND, OREGON.

BELT-TIGHTENER.

1,301,026.   Specification of Letters Patent.   Patented Apr. 15, 1919.

Application filed January 2, 1918.   Serial No. 210,099.

*To all whom it may concern:*

Be it known that I, GEORGE A. YEATON, a citizen of the United States, residing at Portland, county of Multnomah, State of Oregon, have invented certain new and useful Improvements in Belt-Tighteners, of which the following is a specification.

My invention relates to belt tighteners in general, and particularly to such tighteners as are adapted for use with planing and matching machines for lumber mills, and is so illustrated in the accompanying drawing which forms a part of this application for Letters Patent.

Like characters of reference indicate like parts throughout the several views of the drawing, in which:—

Figure 1 is a diagrammatic longitudinal sectional elevation of a planing and matching machine with my device installed thereon.

Fig. 2 is a detail plan of my device.

Fig. 3 is a detail elevation of my device.

The frame of the planing and matching machine is indicated by 4, the drive pulley by 5, the cutter-head pulley by 6, and the drive belt by 7.

In all machines of this character it has been difficult to keep the belt 7 properly upon the pulley 6, said belt falling away from said pulley until the lower edge of the belt drags upon various cross members of the frame not shown in the drawing, which quickly ruins the belt.

It will be understood that there are usually a pair of cutter heads with their respective pulleys 6, each being horizontally adjustable to accommodate various widths of lumber, such as flooring and the like, and any device to satisfactorily control the belt must be horizontally shiftable automatically simultaneously with the shifting of the cutter-head and its respective pulley 6, must take up the slack of the belt 7, and must lead the belt 7 fairly upon the crown of the vertical pulley 6.

To provide such a device is the object of my invention, which I accomplish as hereinafter described, and illustrated in the accompanying drawing.

In general my device consists of a pair of longitudinally adjustable arms, means to adjust the angular relation of said arms, guide pulleys upon said arms, and means whereby the entire device may be shifted transversely by the belt.

The depending arm, as illustrated, is composed of an outer member 8 terminating in a hub 9 in which is mounted a shaft 10 having thereon a rotatable pulley 11; and an inner member 12 terminating in a hub 13 which is loosely mounted upon a shaft 14 of the frame 4.

In order to adjust the length of the depending arm the members 8 and 12 are suitably slotted and secured together by bolts 15.

The horizontal arm, as illustrated, is also composed of two members, the outer member 16 terminating in a hub 17 in which is mounted a shaft 18 having thereon a rotatable pulley 19; and the inner member 20 terminating in a hub 21 which is loosely mounted upon shaft 14 adjacent hub 13.

In order to adjust the length of the horizontal arm members 16 and 20 are suitably slotted and secured together by bolts 22 and 23.

The pulleys 11 and 19 are substantially alined one with the other, but a slight adjustment is sometimes necessary to correct inaccuracies in the belt or other parts of the machine.

Such adjustment I provide by means of a transverse slot 24 in member 16, said slot being an arc about bolt 22 as center and receiving bolt 23 therethrough.

By this means the length of the horizontal arm may be adjusted and the bolt 22 set sufficiently to preserve said adjustment while allowing member 16 to rotate thereabout until the proper transverse relation of the pulleys is obtained, when both bolts 22 and 23 can be tightened to secure the members 16 and 20 in the required relation.

To provide adjustment of the angular relation between the depending and horizontal arms I provide coacting teeth 25 upon the adjacent faces or ends of hubs 13 and 21, and also slotted lugs 26 upon hub 21 and nonslotted lugs 27 upon hub 13, said lugs being connected by bolts 28 which thereby securely hold hubs 13 and 21 with their respective teeth 25 engaged.

To shift the device transversely upon shaft 14 I provide a guide 29 mounted upon member 16 and adapted to embrace the belt 7, so that as the belt shifts it causes the device to slide transversely upon shaft 14.

In use the pulley 11 is adjusted so as to lead the belt 7 fairly upon the crown of pulley 6, and the pulley 19 is adjusted to take up the slack of the belt 7, the angular relationship between the arms being made as to take up substantially all the belt slack when such adjustment has been made.

The device will oscillate slightly upon shaft 14, but due to the difference in length of the two arms it will automatically take up the slack while maintaining true running conditions for the belt within the limits of pulley 6.

My invention may be made of any size and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that can be fairly considered to come within the scope and purview of my invention as defined in the appended claims.

Having disclosed my invention so that others skilled in the art may be enabled to construct and to use the same, what I claim as new and desire to secure by Letters Patent is:

1. In a belt tightener, a pair of longitudinally adjustable arms; a pulley rotatably mounted upon each of said arms; means to rigidly secure said arms in any desired angular relationship; and means to rigidly secure the facial alinement of said pulleys.

2. In a belt tightener, a pair of hubs; coacting teeth upon said hubs; bolts securing engagement between said teeth; a longitudinally adjustable arm upon one of said hubs; a longitudinally and transversely adjustable arm upon the other of said hubs; and a pulley rotatably mounted upon each of said arms.

3. In a belt tightener, a hub; an arm secured to said hub and having a longitudinal slot therein; a member mounted upon said arm and secured thereto by a bolt coacting with said slot, and having therein a transverse slot; a bolt coacting with said longitudinal slot and said transverse slot; and a pulley upon said member.

4. A planing and matching machine having a driving pulley, a vertical driven pulley transversely adjustable, and a quarter turned driving belt, in combination with a belt tightener comprising means to guide said belt substantially upon the crown of said vertical pulley; means to support said belt as it leaves said vertical pulley; means to take up the slack of said belt; and means whereby said belt tightener may be shifted automatically transversely when said vertical pulley is transversely shifted.

In witness whereof I claim the foregoing as my own I hereunto affix my signature in the presence of two subscribing witnesses at Portland, county of Multnomah, State of Oregon, this 22nd day of December, 1917.

GEORGE A. YEATON.

Witnesses:
C. F. BLAKE,
L. J. ROBINSON.

Copies of this patent may be obtained for five cents each, by addressing the "Commissioner of Patents, Washington, D. C."